United States Patent [19]

Zanma et al.

[11] Patent Number: 4,714,592

[45] Date of Patent: Dec. 22, 1987

[54] RADIAL FLOW CATALYTIC REACTOR INCLUDING HEAT EXCHANGE APPARATUS WITHIN THE BED

[75] Inventors: Jun Zanma, Yachiyo; Yoshinori Nishimura, Chiba; Kazuo Shyoji, Funabashi; Makoto Shimagaki, Sakura; Yoichi Nakajima, Chiba, all of Japan

[73] Assignee: Toyo Engineering Corporation, Tokyo, Japan

[21] Appl. No.: 690,028

[22] Filed: Jan. 9, 1985

[30] Foreign Application Priority Data

Jan. 18, 1984 [JP] Japan ................... 59-6826

[51] Int. Cl.$^4$ ............................................. B01J 8/04
[52] U.S. Cl. ................................. 422/192; 422/148; 422/193; 422/195; 422/201; 422/202; 422/218
[58] Field of Search ............... 422/148, 191, 192, 193, 422/195, 200, 201, 202, 218; 165/145, 163, 157; 122/32; 518/706; 423/359–361

[56] References Cited

U.S. PATENT DOCUMENTS

| 1,689,684 | 10/1928 | Reed | 422/148 |
| 1,832,972 | 11/1931 | Ernst | 423/360 |
| 2,715,570 | 8/1955 | King | 422/218 X |
| 2,835,560 | 5/1958 | Bason et al. | 422/207 X |
| 3,663,179 | 5/1972 | Mehta et al. | 422/148 |
| 3,754,078 | 8/1973 | Hinrichs et al. | 422/148 X |
| 4,205,044 | 5/1980 | Gramatica | 420/148 X |
| 4,321,234 | 3/1982 | Ohsaki et al. | 422/200 |
| 4,339,413 | 7/1982 | Lahne et al. | 422/200 |
| 4,359,448 | 11/1982 | Schuurman et al. | 422/201 X |
| 4,405,562 | 9/1983 | Zardi et al. | 422/148 |
| 4,518,574 | 5/1985 | Osman et al. | 423/360 |

FOREIGN PATENT DOCUMENTS

| 193127 | 11/1984 | Japan | 422/148 |
| 2122102 | 1/1984 | United Kingdom | 422/148 |

Primary Examiner—David L. Lacey
Attorney, Agent, or Firm—Flynn, Thiel, Boutell & Tanis

[57] ABSTRACT

An improved reactor is disclosed wherein a high temperature product gas discharged from a catalyst bed within the reactor is cooled in a central heat exchanger installed within the reactor by heat exchange with a low temperature feed gas comprising gaseous raw materials for the reaction, and the product gas is thereafter flowed along the inner surface of an outer pressure vessel in order to maintain the outer pressure vessel at a low temperature. Inlet and outlet pipes for a coolant which coolant is circulated through a coolant passage structure which penetrates the catalyst bed in order to absorb the heat of reaction, both penetrate the top cover of the outer pressure vessel so that the coolant passage structure can be readily removed for maintenance and inspection, and the overall design of the reactor is simplified.

16 Claims, 6 Drawing Figures

RADIAL FLOW CATALYTIC REACTOR INCLUDING HEAT EXCHANGE APPARATUS WITHIN THE BED

FIELD OF THE INVENTION

This invention relates to improvements in a reactor in which a catalytic chemical reaction can be carried out. More specifically, the present invention relates to a reactor having an improved internal structure effective to prevent the pressure vessel of the reactor from increasing in temperature excessively during an exothermic reaction wherein a feed gas that contains a large amount of hydrogen, which feed gas remains gaseous at the temperature and pressure of the reaction, flows radially through a cylindrical catalyst bed of the reactor to produce a product which is gaseous at the temperature and pressure of the reaction.

BACKGROUND OF THE INVENTION

U.S. Pat. No. 4 321 234, the entire contents of which are incorporated herein by reference, discloses a reactor wherein the heat of reaction is removed by coolant that circulates through a number of vertically extending cooling tubes which are arranged parallel to the axis of a single, cylindrical catalyst bed of the reactor. A feed gas flows in the radial direction through the catalyst bed and thereby undergoes an exothermic reaction. The heat of reaction causes the coolant within the cooling tubes to boil. The coolant is fed through the cooling tubes under pressure, at its boiling temperature. After absorbing the heat of reaction, the coolant is discharged from the reactor in the form of a vapor, or a liquid-vapor mixture of the coolant. In the specification, the vapor and the mixture of vapor and liquid are, in combination, called merely as a vapor of the coolant.

U.S. patent application Ser. No. 502,298, now U.S. Pat. No. 4,594,227 filed Sept. 8, 1983, the entire contents of which are incorporated herein by reference, which corresponds to Japanese patent application No. 167639/1982, discloses a reactor wherein the annular, cylindrical catalyst bed formed in the intercylinder space between a pair of inner and outer cylindrical catalyst retainers is subdivided by two or more partition walls which extend radially and vertically. By this means, a plurality of catalyst beds which are sectorial in horizontal cross section are formed. The reactant feed gas is flowed radially through the different catalyst beds in a predetermined sequence, while a coolant liquid is fed through cooling tubes installed in each of the catalyst beds in the same manner as disclosed in U.S. Pat. No. 4 321 234. Using the improved arrangement of U.S. Ser. No. 530 298, the temperature distribution in the direction of the gas flow in the catalyst beds can be optimized in accordance with the purpose and characteristics of the particular reaction that is to be performed. In addition, the heat of reaction can be recovered by making use of the coolant vapor. The reactor of Ser. No. 530 298 is accordingly advantageous for effecting exothermic reactions.

The present inventors have discovered that the outer pressure vessels of the foregoing reactors, according to the prior art, suffer from hydrogen embrittlement. Hydrogen embrittlement occurs when the outer pressure vessel is exposed to a high temperature, high pressure, feed gas containing a large amount of hydrogen. The present invention relates to a reactor which retains the advantageous features of the foregoing two prior art reactors, and which, in addition, is provided with unique structural features that render it less subject to hydrogen embrittlement.

Hydrogen embrittlement can occur when a high temperature, high pressure, feed gas containing a large amount of hydrogen and/or a product gas which also contains a substantial amount of residual hydrogen are brought into contact with a conventional low carbon steel or alloy steel containing a total of 10% by weight or less of alloying components other than iron and carbon. The foregoing product gas is formed from the feed gas by bringing the feed gas into contact with the catalyst in the catalyst bed. After a long period of such contact, the well-known phenomenon called hydrogen embrittlement takes place whereby the low carbon steel or alloy steel is deteriorated by the action of hydrogen and becomes brittle.

As used hereinafter, the term "carbon steel" refers to steel consisting essentially of 0.02 to 0.6 wt. %, preferably 0.1 to 0.4 wt. % carbon, less than 10.0 wt. % preferably less than 5.0 wt. % alloying elements other than iron and carbon, and the balance is essentially iron. The term "carbon steel" used hereinafter refers to both low carbon steels and alloy steels containing up to 10 wt. % of alloying components other than iron and carbon.

As a method for minimizing such hydrogen embrittlement, as disclosed in U.S. Ser. No. 530,298 noted above and many other literatures, a low temperature feed gas can be fed to a reactor having an outer pressure vessel made of carbon steel. Before this low temperature feed gas reaches the reaction temperature, it is first flowed along the inner surface of the outer pressure vessel in order to reduce heat transfer from the catalyst bed of the reactor, which is at a high temperature, to the outer pressure vessel, thereby maintaining the temperature of the outer pressure vessel at 300° C. or lower, preferably 250° C. or lower. Alternatively, an outer pressure vessel can be used which is made of a stainless steel containing more than 10 wt. % of alloying elements other than iron and carbon.

According to methods wherein a low temperature feed gas is flowed along the inner surface of the outer pressure vessel made of carbon steel, the low temperature feed gas can be preheated by causing it to undergo heat exchange with high temperature product gas leaving the catalyst bed, using a heat exchanger that is installed in the reactor. However, the amount of heat needed to preheat the feed gas is less than, the sum of the evolved heat of reaction and the heat content of the product gas leaving the catalyst bed. Consequently, the product gas flowing out of the reactor is normally high in temperature in spite of the heat exchange step, and thus it is not possible to use the product gas for the purpose of preventing the outer pressure vessel made of carbon steel from increasing in temperature by flowing the product gas along the inner surface of the outer pressure vessel after the heat exchange step. The foregoing prior art procedures fail to eliminate the need to make the outer pressure vessel from stainless steel in order to avoid hydrogen embrittlement. The use of stainless steel for making the outer pressure vessel, however, renders the reactor more expensive.

When a low temperature feed gas is first flowed along the inner surface of the outer pressure vessel as described above, the pressure in the flow passage adjacent to the inner surface of the outer pressure vessel is higher than the pressure in the central part of the reactor containing the catalyst beds by an amount corresponding to the pressure drop that occurs due to the flow resistance that the gas encounters as it passes through the catalyst bed and the other flow passages in the reactor. This pressure drop is normally on the order of 5 to 20 kg/cm². The feed gas flowing along the inner surface of the outer pressure vessel is upstream of the gas that is passing through the catalyst bed in the central part of the reactor. Under these circumstances, an external pressure corresponding in magnitude to the foregoing pressure drop is exerted on the external cylindrical partition wall which separates the chambers that differ in pressure. This external pressure tends to collapse the cylindrical partition wall or walls inwardly, with the practical effect being that the cylindrical partition wall will be deformed by buckling. In order to prevent such buckling, the cylindrical partition wall(s) and the radial partition wall(s) which aid in supporting the cylindrical partition wall(s) must be made thicker.

It has also been generally necessary to fabricate the interior cylindrical and radial partition walls mentioned above from stainless steel, because these walls come into contact with gases containing a large amount of hydrogen at a high temperature and pressure. Thus, these partition walls must be made both thicker and of a more expensive material in order to prevent buckling and hydrogen embrittlement. These problems have been generally overlooked in the prior art because the prior art reactors have been built on a relatively small scale. However, it has recently become possible to greatly enlarge the reactor in which a high pressure feed gas containing a large amount of hydrogen is used at a high temperature to synthesize ammonia, methanol and similar products. When such a reactor is built on a large scale, it becomes important to solve the problems of hydrogen embrittlement and buckling of the interior partition walls without using large amounts of expensive stainless steel.

SUMMARY OF THE INVENTION

Figure 1:
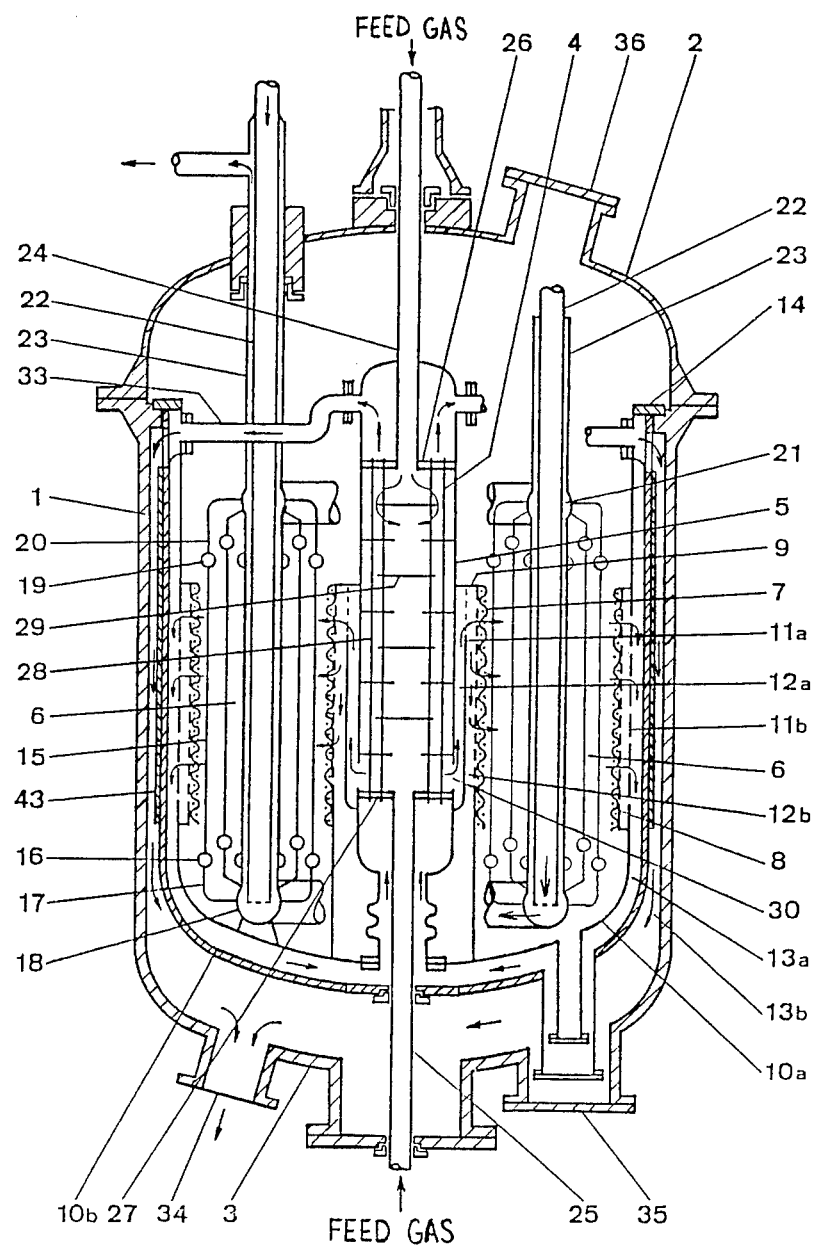
FIG. 1 is a vertical sectional view of a reactor according to the present invention.

The reactor according to the present invention ameliorates the problems of hydrogen embrittlement of the outer pressure vessel and buckling of the inner partition walls, but without, however, using an excessive amount of expensive stainless steel. According to the invention, the high temperature product gas leaving the catalyst bed after completion of the reaction is cooled sufficiently by undergoing heat exchange with a low temperature feed gas within a heat exchanger installed in the reactor. The thus-cooled product gas is thereafter allowed to flow along the inner surface of the outer pressure vessel. A feed pipe for the liquid coolant, which is to be supplied to the bottoms of the cooling tubes and to flow upwardly therein, penetrates into the interior of the reactor through a top cover or top wall thereof. This arrangement facilitates maintenance and inspection of the interior of the reactor, and allows the product gas which has left the catalyst bed and has been cooled by the foregoing heat exchange step to flow without interruption along the interior surface of the outer pressure vessel.

DETAILED DESCRIPTION

The product gas which leaves the catalyst bed and is cooled in the heat exchanger, according to the invention, is the most downstream portion of the gas that is flowing through the reactor and is, therefore, at the lowest pressure within the reactor. By flowing this gas along the inner surface of the outer pressure vessel, the pressure difference between the flow passage adjacent to the interior of the outer pressure vessel and the central chambers of the reactor is reversed as compared to the procedure employed in the prior art as described above, so that the partition walls which separate the product gas flow space from the central chambers of the reactor are subjected to an internal pressure which corresponds in magnitude to the pressure drop that the gas undergoes as it flows through the catalyst bed. As a result, the force exerted on the partition walls is a tensile force instead of a collapsing force, and the problem of buckling of these partition walls is thereby avoided.

This solution to the problem of buckling of the interior partition walls is possible only when a substantial portion of the total reaction heat generated is removed and recovered as the latent heat of vaporization of the coolant which flows through the cooling tubes in the catalyst bed or beds, as described in detail in the aforementioned U.S. Pat. No. 4,321,234 and U.S. Ser. No. 530,298, filed Sept. 8, 1983. Thus, according to the present invention, an upright, annular, cylindrical catalyst bed defined by the intercylinder space between a pair of inner and outer cylindrical catalyst retainers has a multiplicity of vertical cooling tubes extending therethrough.

More particularly, for a highly exothermic reaction, the amount of heat required to preheat the low temperature feed gas to the desired reaction temperature is generally less than the sum of the heat evolved by the reaction and the heat content of the product gas which is discharged from the catalyst bed. Consequently, if the gas discharged from the catalyst bed is cooled, as disclosed in the prior art, by allowing the low temperature feed gas to undergo heat exchange with the high temperature product gas in a heat exchanger inside the reactor without removal of reaction heat by any other means, for the purpose of merely preheating the feed gas, then the sum of the amounts of the heat of reaction and the heat content of the high temperature product gas will greatly exceed the heat needed to preheat the feed gas. Under such circumstances, it is impossible to cool the product gas to a sufficiently low temperature as required in the present invention.

Since most of the total exothermic heat of the reaction is removed as the latent heat of vaporization of the coolant in the reactor, according to the present invention, there is no significant difference between the heat content of the product gas that flows out of the catalyst bed and the amount of heat required to preheat the feed gas, so that the gas that flows out of the catalyst bed can be cooled to a sufficiently low temperature by undergoing heat exchange with the low temperature feed gas. Thus, by virtue of the cooling tube arrangement used in the reactor according to the present invention, it is possible to use an outer pressure vessel made of carbon steel, as defined above. The internal partition walls of the reactor, namely, the coaxial cylindrical catalyst retainer walls and the radial partition walls extending between these retainer walls, can be made of relatively thin stainless steel.

In the reactors disclosed by U.S. Pat. No. 4,321,234 and U.S. Ser. No. 530,298, the feed pipe for supplying the coolant to the cooling tubes extends through the bottom cover or bottom wall of the reactor. According to the present invention, however, in order to allow the cooled product gas to flow along the inner surface of the outer pressure vessel, it is necessary to isolate the intercylinder space containing the catalyst beds from the outer pressure vessel. To achieve this, at least one partition wall must be provided at a location spaced from the interior surface of the cylindrical portion of the outer pressure vessel and also spaced from the interior surface of the bottom wall of the outer pressure vessel. When the coolant feed pipe is introduced through the bottom of the reactor, this feed pipe must pass through both the partition wall and the bottom wall of the outer pressure vessel. It is not impossible to extend a coolant feed pipe through a partition wall and a bottom wall. However, in the reactor of the present invention, the outer pressure vessel is maintained at a relatively low temperature. There may accordingly exist a temperature difference of at least 100° C., more likely 200°–300° C., between the outer pressure vessel and the coolant feed pipe, because the liquid coolant is at its boiling temperature. There is also a temperature difference of about 100° C. between the aforesaid partition wall and the coolant feed pipe. To minimize thermal stress of a coolant feed pipe that extends through the bottom of the reactor, caused by the foregoing temperature difference, a complex and expensive feed pipe structure would be needed, and such an arrangement would make maintenance and inspection of the reactor inconvenient. To avoid such problems, the coolant feed pipe in the reactor according to the present invention extends through the top wall of the outer pressure vessel. That is, the coolant feed pipe, according to this invention, penetrates through the top wall of the reactor, extends downwardly through the catalyst bed, and then connects to manifolds provided at the bottom of the catalyst bed to distribute the coolant into each of the cooling tubes to flow upwardly therein. When this structure is employed, the coolant in the coolant feed pipe will normally boil in the portion of the coolant feed pipe which passes through the catalyst bed. In this case, it is important to employ a structure wherein the coolant vapor generated by this boiling does not interfere with the downward movement of the coolant in the coolant feed pipe.

As a specific structure for this purpose, the portion of the coolant feed pipe which passes through the catalyst bed may be covered with a heat insulating material. Alternatively, a duplex pipe can be employed so that the coolant is fed downwardly inside of the inner pipe of the duplex pipe, and the annular space between the inner and outer pipes of the duplex pipe is open to the distributing manifold at its bottom end and is connected to the discharge outlet for the coolant vapor at its top end. In this annular space, the coolant vapor is present close to or at the same temperature as the coolant flowing downwardly inside of the inner pipe. Although it is possible to separately provide (1) a discharge pipe for the vapor generated by the boiling coolant in each of the cooling tubes and (2) the foregoing coolant feed pipe through the top cover, the coolant feed and discharge pipes are preferably installed as a single duplex pipe penetrating the top wall as described above. This improves the simplicity of the installation and the efficiency of heat insulation. By this means, it becomes easier to install the cooling system which comprises the coolant feed pipe, coolant vapor discharge pipe, distributing manifolds, cooling tubes and collecting manifolds. This cooling system can be installed by suspending it from the upper end of the reactor or by mounting it on a floor provided on the partition wall which isolates the catalyst bed from the bottom wall of the outer pressure vessel. By this means, the cooling system or coolant passage structure is mounted on the outer pressure vessel at only one location. As a result, it becomes possible to make the reactor structure substantially free from thermal stress even if there is a large temperature difference between the outer pressure vessel and the coolant passage structure.

The present invention is described in further detail below in examples illustrated by the attached drawings, but the scope of the invention is not limited to these examples.

FIG. 1 illustrates a vertical cross section of an exemplary reactor according to the present invention wherein a single, annular, cylindrical catalyst bed is employed. The substantially cylindrical outer pressure vessel 1 has a dome-shaped top cover 2 and a dome-shaped bottom wall 3. A substantially cylindrical heat exchanger 4 is mounted inside the outer pressure vessel 1 and is coaxial therewith. An annular catalyst bed 6 surrounds the heat exchanger 4. The inner periphery of the catalyst bed 6 is radially outwardly spaced from an outer shell 5 of the heat exchanger 4. The catalyst bed 6 is formed by packing a granular catalyst in the annular, intercylinder space between a gas-permeable, cylindrical, inner, catalyst retainer 7 provided at a desired radial separation from the outer surface of the outer shell 5, and a gas-permeable, cylindrical, outer, catalyst retainer 8 which is larger in diameter than the inner catalyst retainer 7 and is coaxial therewith.

Both of the catalyst retainers 7 and 8 comprise a cylinder having a large number of holes or perforations extending therethrough over the entire vertical surface thereof, whereby reactant gas can freely flow substantially horizontally and radially through the catalyst bed 6. From one to three sheets of netting or mesh are attached to each of the retainers 7 and 8 and covering the holes thereof to prevent the catalyst particles from leaking through the holes. The upper end of the annular space between the inner catalyst retainer 7 and the outer shell 5 of the heat exchanger 4 is sealed by a removable annular closure plate 9 which blocks upward flow of the gas. This annular space defines a gas flow passage which is divided into a first, inner, annular, cylindrical, gas flow passage 12a and a second, inner, annular, cylindrical, gas flow passage 12b by a cylindrical wall 11a which is attached in a gas-tight fashion at its lower end to the lower part of the outer shell 5 of the heat exchanger 4. The wall 11a has a plurality of holes extending therethrough near the upper end thereof which allow a uniform vertical distribution of the reactant gas through the inner catalyst retainer 7. The total surface area occupied by holes on the wall 11a is generally smaller than the corresponding area occupied by holes on the inner catalyst retainer 7.

In this example the outer catalyst retainer 8 is spaced a desired radial distance inwardly from the cylindrical portion of an inner cup-shaped partition wall 10a. The partition wall 10a has an upright cylindrical wall portion and a substantially hemispherical bottom wall portion. The partition wall 10a separates the catalyst bed 6 from the outer pressure vessel 1, including the bottom cover 3 thereof. The annular space between the outer catalyst retainer 8 and the partition wall 10a is sealed by horizontal, annular top and bottom walls of the outer catalyst retainer 8. The partition wall 10a has a large number of holes extending therethrough over the vertical surface thereof that faces the outer catalyst retainer 8. This perforated wall portion 11b is radially outwardly spaced from the outer catalyst retainer 8, and causes the reactant gas to flow evenly through the catalyst bed 6 over the vertical dimension thereof. The space between the inner partition wall 10a and the outer pressure vessel 1 is divided into first and second, outer gas flow passages 13a and 13b by a second, outer partition wall 10b which is attached in gas-tight fashion to the partition wall 10a near the upper end of the wall 10a. The partition wall 10b is of substantially the same shape as the wall 10a, but is larger in size and of larger wall thickness. The first passage 13a is defined between the outer surface of the wall 10a and the inner surface of the wall 10b. The second passage 13b is defined between the outer surface of the wall 10b and the inner surface of the outer pressure vessel 1.

The lower end of the cylinder which defines the inner catalyst retainer 7 is joined at the lower end thereof to the partition wall 10a in a gas-tight fashion. The lower end of the outer shell 5 of the heat exchanger 4 is also joined to the partition wall 10a so that the connection therebetween is gas-tight. In the foregoing structures, the components of the heat exchanger 4 housed within the outer shell 5 thereof, the catalyst retainers 7 and 8, the partition walls 10a and 10b and parts connected thereto are suspended from the pressure vessel by means of a flange 14 provided at the upper end of the partition wall 10a, which flange rests on a shoulder provided near the upper end of the cylindrical central portion of the outer pressure vessel 1. The surface of the partition wall 10b facing the outer pressure vessel 1 is covered by a a layer 43 of heat insulating material to prevent heat from escaping outwardly from the partition wall 10b. Although the outer catalyst retainer 8 is disposed inside of the partition wall 10a in the embodiment shown, it is also possible to change the structure of this portion so that the perforated portion of the outer catalyst retainer 8 is made part of the partition wall 10a, and the perforate wall 11b projects outwardly of the partition wall 10a in the annular space between the outer partition walls 10a and 10b.

A large number of cooling tubes 15 extend vertically through the catalyst bed 6. The tubes 15 are arranged in a multiplicity of concentric circles which are coaxial with the central vertical axis of the reactor. The cooling tubes 15 can be connected so as to define a single cooling zone encircling the central axis of the catalyst bed, or they can be connected so as to define two or more circumferentially, spaced, separate cooling zones, each of which is of sectorial shape in horizontal cross section. This will be described hereinbelow with reference to FIG. 6 and it is disclosed in greater detail in U.S. Ser. No. 530,298.

Each cooling zone has at least one coolant feed pipe 22 and at least one coolant vapor discharge pipe 23 associated therewith. The lower ends of the cooling tubes 15 are connected to secondary distributing manifolds 16 of a secondary distributing structure. When the cooling tubes 15 are connected to form a single cooling zone of annular shape, the manifolds 16 can be circular in plan view. When the cooling tubes 15 are connected to form a plurality of separate, arcuate cooling zones located in side-by-side relation, each manifold 16 can be of the same arcuate extent as the cooling zone of which it is a part. Each of the secondary distributing manifolds 16 is connected by at least one connecting tube 17 to a primary distribution manifold 18 which comprises a circular tube when a single cooling zone is provided or arcuate tubes if multiple cooling zones are being employed.

The upper ends of the cooling tubes 15 are connected to primary collecting manifolds 19 in the primary collecting structure, which collecting manifolds 19 are arranged in the same way as the distributing manifolds 16. Each of the primary collecting manifolds 19 is connected by at least one connecting tube 20 to a secondary circular collecting manifold 21 which is arranged in the same way as the distribution manifold 18.

All of the primary and secondary distributing and collecting manifolds 16, 18 and 19, 21 extend substantially horizontally, and adjacent secondary distributing manifolds 16 and primary collecting manifolds 19 are staggered at different vertical heights. It is preferred to position the secondary distributing manifolds 16 slightly lower than the lower ends of the gas-permeable portions of the catalyst retainers 7 and 8. The primary distributing manifold 18 is positioned below its associated secondary distributing manifolds 16. The primary collecting manifolds 19 are positioned slightly higher than the upper ends of the gas-permeable portions of the catalyst retainers 7 and 8. The secondary collecting manifold 21 is disposed above the primary collecting manifolds 19. Further details regarding the arrangement of cooling tubes, primary and secondary distributing structures and primary and second collecting structures are given in the aforementioned U.S. Pat. No. 4,321,234 and U.S. Ser. No. 530, 298.

The secondary collecting manifold 21 in each cooling zone communicates with at least one coolant vapor discharge pipe 23 which extends outside of the reactor. A coolant feed (inlet) pipe 22 is provided as an inner pipe inside the secondary collecting manifold 21 and the coolant vapor discharge pipe 23 located thereabove. The coolant feed pipe 22 penetrates vertically through the secondary collecting manifold 21 in each cooling zone and extends substantially vertically downwardly through the catalyst bed 6 and communicates with the primary distributing manifold 18 at the lower end of the cooling zone. In this context, "cooling zone" refers to the entirety of the annular catalyst bed when the cooling tubes 15 are connected to form a single circular cooling zone and it refers to a sectorial subdivision of the annular catalyst bed when the cooling tubes are connected to form a plurality of arcuate cooling zones. Several cooling zones can be employed even when the annular catalyst bed is not subdivided. In this example, the coolant feed pipe 22 that extends between the upper end of a primary distributing manifold 18 and the lower end of its associated secondary collecting manifold 21 comprises the inner pipe of a duplex pipe. The annular space between the inner and outer pipes 22, 23 communicates at its upper end with the coolant vapor discharge outlet and communicates at its lower end with the primary distributing manifold 18. A duplex pipe is used in order to prevent the coolant from boiling as it flows downwardly within the coolant feed pipe 22 due to the generation of heat in the catalyst bed, and thus prevent the downward movement of the coolant through the pipe 22 from becoming obstructed by the evolved coolant vapor. Using the duplex pipe, some liquid coolant and vapor thereof at the same temperature as the liquid coolant flow upwardly through the annular space between the inner and outer pipes 22, 23 so that heat transfer from the high temperature catalyst bed 6 into the coolant feed pipe 22 is reduced. As an alternative, the outer pipe of the duplex pipe can be replaced by a heat insulating structure comprising an insulating layer.

In the coolant passage structure described above, the coolant passes through the coolant feed pipe 22 into the cooling zone and is distributed from the primary distributing manifolds 18 through a plurality of connecting pipes 17 into the secondary distributing manifolds 16. From the manifolds 16 it is further distributed into a large number of cooling tubes 15. As the coolant absorbs reaction heat evolved in the catalyst bed, the coolant boils and is converted to its vapor in the cooling tubes, and the coolant vapor from the cooling tubes is combined in the primary collecting manifolds 19 and fed via the pipes 20 to the secondary collecting manifold 21 for each cooling zone. The vapor is then discharged from the reactor via the annular space between the coolant vapor discharge pipe 23 and the coolant feed pipe 22.

In the shell-and-tube heat exchanger 4, wherein a plurality of tubes 28 are arranged substantially vertically parallel to the central vertical axis of the reactor, a main gas feed pipe 24 from the outside of the reactor is connected, by means of a gas-tight connection, to an upper annular plate 26 which comprises part of the outer shell 5 of the heat exchanger 4 and defines the upper end of the compartment in which heat exchange takes place. The pipe 24 opens to the shell side of the heat exchanger 4 within the compartment defined by the interior of the outer shell 5. A second gas feed pipe 25, the purpose of which will be described hereinbelow, is connected to a lower annular plate 27 which defines a bottom wall of the heat exchanger 4. The second feed pipe 25 penetrates the partition walls 10a and 10b from outside of the reactor and opens to the shell side of the heat exchanger 4 above the lower annular plate 27. The lower end of the outer shell 5 of the heat exchanger 4 is joined to the partition wall 10a by means of an outer pipe and bellows which surround the second gas feed pipe 25 and are spaced apart therefrom a selected distance.

The interior structure of the shell-and-tube heat exchanger 4 between the upper and lower plates 26, 27 is conventional. A plurality of vertical tubes 28, preferably disposed in one or more circular arrays coaxial with the vertical central axis of the reactor, extend between the upper and lower plates 26, 27 and define the tube side of the heat exchanger 4. The shell 5 of the heat exchanger 4 includes a plurality of horizontal baffle plates 29 which cause the feed gas fed from the pipe 24 to move in a zig-zag path through the interior of the heat exchanger 4 as it flows downwardly. The greater part of the fresh feed gas is introduced through the main feed pipe 24 and it undergoes heat exchange with a high temperature product gas discharged from the catalyst bed which flows through the tubes 28. This preheats the fresh feed gas on the shell side of the heat exchanger to a temperature at which the reaction is initiated, and this feed gas is then passed uniformly in all radial directions from the inside to the outside of the catalyst bed 6. To reach the bed 6, the feed gas flows through at least one opening 30 formed at the lower end of the outer shell 5, then passes through the inner and outer annular gas passages 12a and 12b as described above and enters the catalyst bed 6 through the inner catalyst retainer 7.

The desired reaction takes place as the gas passes through the catalyst bed 6 and contacts the catalyst, thereby generating a gaseous product. Most of the reaction heat generated by the exothermic reaction is absorbed by the coolant that flows through the tubes 15. After the reaction is completed and most of the reaction heat has been absorbed by the coolant, the product gas, which is still quite high in temperature, flows through the outer catalyst retainer 8, thence via the perforate wall 11b into gas passage 13a. The gas passage 13a communicates with the tubes 28 of the heat exchanger 4 via the annular space between the outer shell 5 and the pipe 25 in the lower part of the heat exchanger 4. The high temperature product gas flows upwardly through the tubes 28, is cooled by heat exchange with the feed gas on the shell side of the heat exchanger 4, and is discharged into a chamber at the upper end of the heat exchanger above the plate 26. The product gas is then fed through a plurality of connecting pipes 33 to the gas passage 13b. In the passage 13b, the product gas passes downwardly along the inner surface of the outer pressure vessel 1 and passes downwardly to a lower chamber located between the bottom cover 3 and the outer partition wall 10b. The product gas is then finally discharged outside of the reactor through the product gas outlet 34.

By means of the foregoing interior reactor structure and the above-described gas passages, the pressure inside the outer shell 5 of the heat exchanger 4 can be kept higher than the pressure outside of the outer shell of the heat exchanger. Further, the gas pressure within the inner catalyst retainer 7 is higher than the pressure outwardly thereof, and a similar pressure relationship can be set up for the outer catalyst retainer 8 and the partition walls 10a, 10b.

In accordance with this reactor pressure distribution, the partition walls 7, 8 of the reactor can be designed based on tensile strength which is used for strength calculations when the inner pressure of a vessel is higher than the outer pressure thereof, rather than basing it on buckling strength or collapsing strength which is used when the outer pressure of a vessel is higher than its inner pressure. This allows thinner plates to be used as the reactor partition walls 7, 8 when these partitions are made from ordinary platelike materials.

In FIG. 1, the secondary gas feed pipe 25 which extends upwardly from the central portion of the bottom of the reactor is used as an inlet for a reducing gas for reduction of the catalyst or as an inlet for a high temperature gas for preheating the catalyst bed during start-up of the reactor. In normal operation, it can also be used as an inlet for a low temperature feed gas to effect fine adjustment of the temperature of the feed gas that is preheated in the heat exchanger 4, or it can be used as an inlet for an inert gas or product gas adjusted to a desired temperature for use as a diluent gas in cases in which the reaction occurring in the catalyst bed is extremely vigorous. A closeable outlet 35 is provided on the bottom cover 3 as an exhaust port for removing spent catalyst. The catalyst is charged into the reactor through an inlet 36 formed on the top cover 2 of the reactor and is packed around the tubes 15 comprising the coolant passage structure. The mounting structure for the coolant passages, heat exchanger, catalyst retainers, partition walls 10a and 10b and parts associated therewith can be removed, in this order, from the outer pressure vessel 1 after the catalyst is discharged through the catalyst outlet port 35 and the top cover 2 has been removed. This facilitates maintenance and inspection of the reactor of the present invention considerably as compared with prior art reactors.

Figure 2:
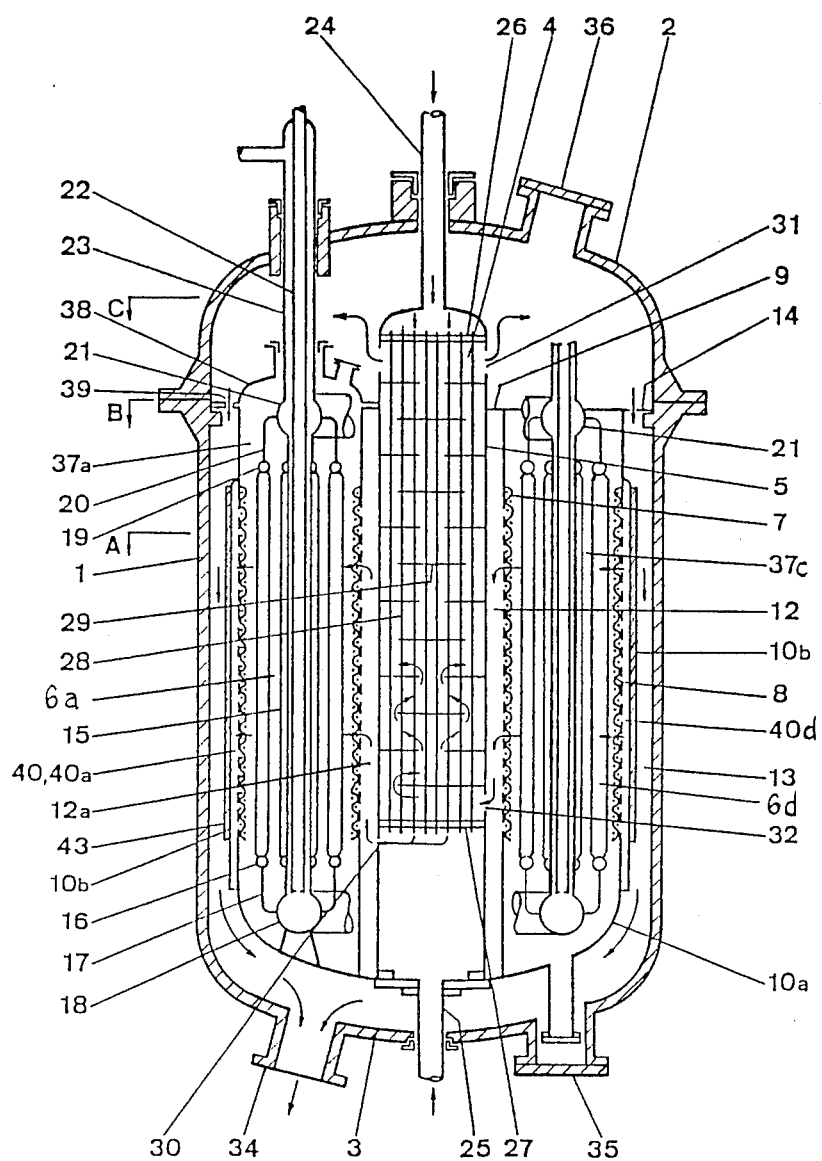
FIG. 2 is a vertical sectional view of a reactor according to a second embodiment of the invention taken along the line II—II in FIG. 3.
Figure 3:
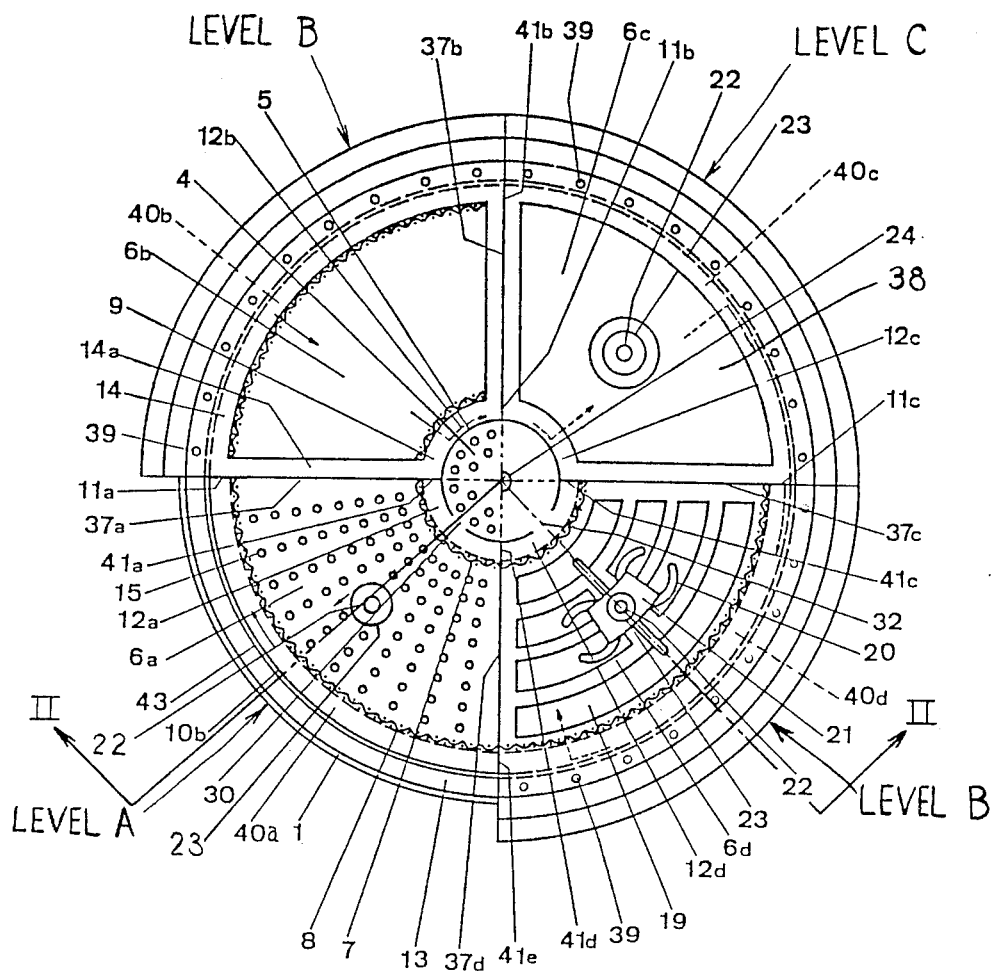
FIG. 3 is a split, horizontal cross-sectional view of the reactor shown in FIG. 2 at different heights A, B and C.
Figure 6:
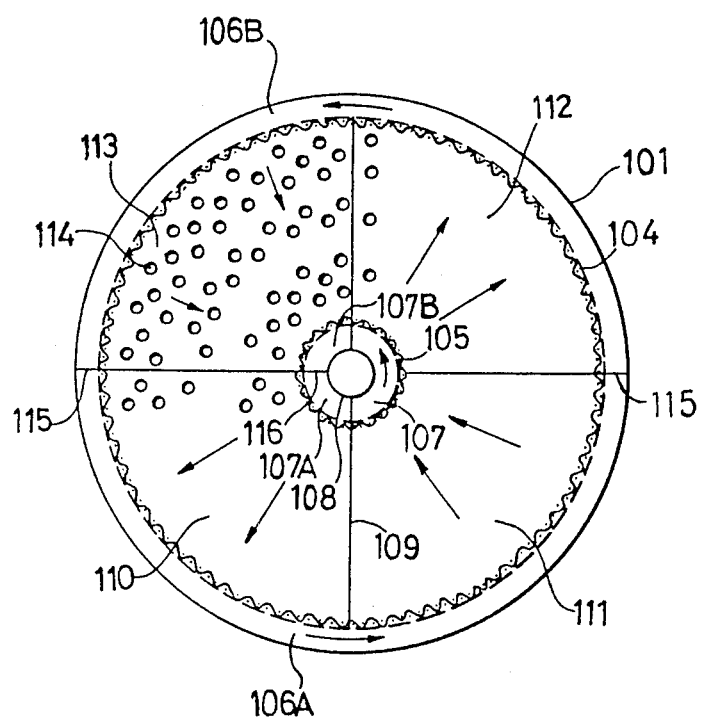
FIG. 6 is a schematic horizontal cross-sectional view of a reactor in which the catalyst is provided in the form of a plurality of catalyst beds and the feed gas as flowed in series through the catalyst beds.

FIG. 6 corresponds to FIG. 2 of Ser. No. 530,298 and it is presented to schematically illustrate an apparatus for flowing feed gas in series through a plurality of sector-shaped catalyst bed sections. Ser. No. 530,298 discloses many additional embodiments of apparatus of this type and reference should be made thereto for any additional details. The hereinafter described embodiment of FIGS. 2 and 3 is based on the operating principles of the apparatus illustrated in FIG. 6.

Inside the outer shell 101, there are provided a gas-permeable, outer, catalyst retainer 104 and an inner catalyst retainer 105 within the outer catalyst retainer 104, both retainers 104 and 105 being coaxial with each other and with the central axis of the outer shell. The outer annular space defined between the outer shell 101, the outer catalyst retainer 104 and the bottom and top walls provides an outer gas flow passage. The outer gas flow passage 106 is divided by outer dividing walls 115 into passages 106A and 106B. Inside the inner catalyst retainer 105, there are provided an inner circular barrier wall 108, which could be the shell of a shell-and-tube heat exchanger, and inner radially extending dividing walls 116 which extend radially outwardly from the circular barrier wall 108 to the inner catalyst retainer 105. The space defined by the inner catalyst retainer 105, barrier wall 108 and bottom and top walls is thereby divided into a plurality of inner gas flow passages 107 and 107A and 107B by the dividing walls 116. The space defined by the outer catalyst retainer 104, inner catalyst retainer 105 and bottom and top walls is divided by radially extending vertical partition walls 109 into a desired number of chambers (4 in the illustrated example) 110, 111, 112 and 113, which are respectively sectorial in horizontal cross section, that is, in the shapes of segments of an annulus.

In the example illustrated in FIG. 6, all of these chambers 110, 111, 112 and 113 are used as reaction chambers and, in each of them, heat-exchanging tubes 114 are arranged and a catalyst is packed. In each of these chambers, gas is caused to flow in a radial direction. It is necessary to determine, in advance, the order of the reaction chambers, that is, the order in which the gas is caused to pass in series through the reaction chambers 110, 111, 112 and 113, and the direction of the flow of the gas in each reaction chamber.

In the illustrated example, the reaction chambers are used in the order of (1) radially outward flow in the first reaction chamber 110, (2) radially inward flow in the second reaction chamber 111, (3) radially outward flow in the third reaction chamber 112, and (4) radially inward flow in the fourth reaction chamber 113. By causing the gas in the first chamber 110 to flow radially outwardly from the inner gas flow passage 107A to the outer gas flow passage 106A, the orders of gas flow through the remaining reaction chambers and the direction of flow of the gas in each reaction chamber are determined. In each reaction chamber, heat-exchanging tubes 114 are arranged in a number of partially circular groups, which groups are concentric with the common central axis of the shell 101 and the catalyst retainers 104 and 105. That is, the heat-exchanger tubes of each group are vertically extended in each reaction chamber and equidistantly arranged in the circumferential direction on each of a plurality of horizontal concentric arcs each of which has a different, desired distance from the coxmon axis of the reaction chamber, and length of which depends on the arcuate extent of the reaction chamber in which that group of tubes is disposed, for example, 90° in the reactor of FIG. 6.

Furthermore, in order to control the order of flow of the gas through the reaction chambers, there are provided the radially outwardly extending outer dividing walls 115 which divide the outer gas flow space into outer gas flow passages 106A and 106B. The outer dividing walls 115 are radially aligned with and define extensions of the partition wall 109 between the first and fourth reaction chambers 110, 113 and the partition wall 109 between the second and third reaction chambers 111, 112. The radially extending inner dividing walls 116 that define the inner gas flow passages 107, 107A and 107B are respectively located on (1) extensions of the partition wall 109 between the first and second reaction chambers 110, 111, (2) the partition wall 109 between the third and fourth reaction chambers 112, 113 and (3) the partition wall 109 between the fourth and first reaction chambers 113, 110. In accordance with the gas flow path established as described above, a feed gas inlet and a reaction product gas outlet are respectively provided at the upper or lower ends of the inner gas flow passages 107A and 107B, respectively, said inlet being in communication with the first reaction chamber 110, and said outlet being in communication with the fourth reaction chamber 113.

FIGS. 2 and 3 illustrate a further embodiment of the reactor of the present invention. In this second embodiment, the catalyst bed 6 is subdivided into four catalyst beds 6a, 6b, 6c and 6d of equal sectorial size by vertical partitions walls which extend radially from the inner catalyst retainer to the outer catalyst retainer at 90° angles to each other. Each of the separate catalyst beds defined by the partition walls constitutes an independent cooling zone which is cooled by a cooling passage structure as described above in connection with FIG. 1.

FIG. 2 shows a vertical section of the reactor of this example, and FIG. 3 shows a horizontal cross section of this reactor. As shown in FIG. 3, the four catalyst beds 6a–6d are defined by the radially extending partition walls 37a, 37b, 37c and 37d. FIG. 3 illustrates horizontal cross sections through each catalyst bed at different vertical positions. The horizontal cross section of the first catalyst bed 6a is taken at height A shown in FIG. 2. The second catalyst bed 6b is shown at height B in FIG. 2 with the coolant passage structure and top cover 38 being omitted. The third catalyst bed 6c is shown at height C in FIG. 2 and showing the coolant passage structure and top cover 38 thereof. The fourth catalyst bed 6d, including the coolant passage structure associated therewith but without the top cover 38, is shown at height B in FIG. 2.

The reactor of this embodiment is essentially different from the reactor of FIG. 1 in that the feed gas flows through the catalyst beds in series from the first to the fourth catalyst beds 6a–6d, and flows radially through each catalyst bed. Although there are various possible paths by which the feed gas can be flowed through the four catalyst beds in series, in this embodiment the feed gas flows radially outwardly in the first catalyst bed 6a, radially inwardly in the second catalyst bed 6b, radially outwardly in the third catalyst bed 6c and radially inwardly in the fourth catalyst bed 6d.

A heat exchanger 4 is centrally installed coaxially with the central vertical axis of the reactor in the same manner as described in connection with FIG. 1. A cylindrical gas-permeable inner catalyst retainer 7 is coaxial with the heat exchanger 4 and outwardly spaced therefrom. The annular space 12 is subdivided by four radially, vertically extending partition walls into four gas passages 12a, 12b, 12c and 12d associated with the catalyst beds 6a–6d, respectively. The inner catalyst retainer 7 includes a central perforated cylindrical portion and a pair of cylindrical nonperforated end portions disposed vertically above and below the perforated portion as shown in FIG. 2. An annular, horizontal closure plate 9 is provided between the cylindrical outer shell 5 of the heat exchanger 4 and the top end of the inner catalyst retainer 7, and the lower end of the catalyst retainer 7 is mounted on the inner surface of the partition wall 10a, the foregoing connections being gas-tight. The annular horizontal closure plate 9 also serves as a flange for mounting a top cover 38 over each of the catalyst beds 6.

The cylindrical gas-permeable outer catalyst retainer 8 is installed radially outwardly of the inner retainer 7 so that the top edge of the outer retainer 8 is at the same height as the top edge of the inner retainer 7. Like the inner retainer 7, the outer retainer 8 includes a central cylindrical perforated portion and a pair of cylindrical nonperforated end portions above and below the central perforated portion. The upper end of the outer retainer 8 is joined to the flange 14 which is in the same plane as the closure plate 9, and the lower portion of the outer retainer 8 comprises part of the partition wall 10a which separates the bottom cover 3 from the catalyst bed 6.

The flange 14 has a plurality of vertically extending spaced-apart gas passage holes 39 around its circumference. The partition walls 37a–37d which define the catalyst beds 6a–6d extend radially between the inner and outer catalyst retainers 7, 8 in the positions shown in FIG. 3. The upper ends of the partition walls 37a–37d are connected to four corresponding horizontal, radially extending flange portions 14a which are integral with the closure plate 9 and the annular flange 14. The lower ends of the partition walls 37a–37d are joined in a gas-tight fashion to the partition wall 10a.

The cylindrical outer partition wall 10b disposed radially outwardly of the perforated portion of the outer catalyst retainer 8 defines therewith an annular cylindrical space 40. The upper and lower ends of the partition wall 10b are joined gas-tight to the foregoing upper and lower nonperforated portions of the outer catalyst retainer 8. The outer surface of the partition wall 10b is covered with a layer of heat insulating material 43. The cylindrical gas passages 12 and 40 are used to allow the reactant gas to flow in the circumferential direction inside the inner catalyst retainer and in the circumferential direction outside the outer catalyst retainer, respectively. For example, the gas passage 12 allows reactant gas to flow from the second catalyst bed 6b to the third catalyst bed 6c, and the gas passage 40 allows the gas to flow from the first catalyst bed 6a to the second catalyst bed 6b. Each of the gas passages comprising one quarter of the original unsubdivided passages 12 and 40 are designated 12a–12d and 40a–40d respectively for the passages associated with the respective catalyst beds 6a–6d.

To allow the gas to flow through the catalyst beds alternately radially inwardly and outwardly and also to allow it to flow uniformly in both circumferential and vertical directions in each catalyst bed, the spaces 12 and 40 in this embodiment are designed as follows. First, a gas passage inner partition wall 41a, which is an extension of the partition wall 37a, is provided between the gas passages 12a and 12b to prevent direct gas flow therebetween. A perforated outer plate 11a, which is an extension of the partition wall 37a, is provided between the gas passages 40a and 40b to allow flow therebetween. A gas passage partition wall 41b, which is an extension of the partition wall 37b, is provided between the gas passages 40b and 40c to prevent direct gas flow therebetween. A perforated inner plate 11b, which is an extension of the partition wall 37b, is provided between the gas passages 12b and 12c to allow gas flow therebetween. A gas passage inner partition wall 41c, which is an extension of the partition wall 37c, is provided between the gas passages 12c and 12d to prevent direct gas flow therebetween. A perforated outer plate 11c, which is an extension of the partition wall 37c, is provided between the gas passages 40c and 40d to allow gas flow therebetween. A gas passage inner partition wall 41d, provided on the extension of the partition wall 37d, prevents direct gas flow between the passages 12d and 12a. Finally, a gas passage outer partition wall 41e provided on the extension of the partition wall 37d cuts off gas flow between the gas passages 40d and 40a. By means of the partition walls 41a–41e and plates 11a–11c, the gas flow follows the path indicated by the arrows in FIG. 3 and passes in succession through the catalyst beds 6a, 6b, 6c and 6d.

The coolant passage structure of this embodiment is substantially the same as shown in FIG. 1, and detailed description thereof will be omitted. Each coolant passage structure associated with each cooling zone, namely the sectorial spaces which contain the catalyst beds 6a–6d, can be removed upwardly from each of the catalyst beds 6a–6d after removal of the top cover 2 and catalyst bed cover 38. The heat exchanger 4 is of the shell-and-tube type as in FIG. 1, and is designed so that the fresh feed gas can be flowed downwardly through the tubes 28. The feed gas fed into the reactor through the main inlet 24 enters the tops of a large number of tubes 28 in the heat exchanger 4 and is preheated by heat exchange with the high temperature product gas that flows from the fourth (final) catalyst bed 6d, through the opening 32 and thence through the shell side of the heat exchanger 4. The thus-preheated feed gas is discharged into the gas passage 12a through an opening 30 provided in the outer shell 5 positioned below the lower annular plate 27 of the heat exchanger 4. The gas passes radially outwardly from the gas passage 12a through the inner catalyst retainer 7 and first catalyst bed 6a to the gas passage 40a. The catalytic reaction proceeds partially during the passage of the reactant gas through the first catalyst bed 6a.

From the gas passage 40a, the partially reacted gas enters the gas passage 40b through the perforated resistance plate 11a. Thereafter, it passes radially inwardly through the second catalyst bed 6b to the gas passage 12b. The reaction proceeds further during the passage of the gas through the second catalyst bed 6b. The gas then passes from the gas passage 12b through the perforated resistance plate 11b into the gas passage 12c. Thereafter, the gas stream passes radially outwardly through the third catalyst bed 6c to the gas passage 40c, and the reaction proceeds further as the gas passes through the third catalyst bed 6c. The further reacted gas then passes from the gas passage 40c through the perforated resistance plate 11c to the gas passage 40d. Thereafter, it passes radially inwardly through the fourth catalyst bed 6d to the gas passage 12d. The reaction proceeds to completion as the reactant gas passes through the fourth catalyst bed.

The resulting high temperature product gas passes into the gas passage 12d and flows through an opening 32 into the shell side of the heat exchanger 4 near the bottom thereof. The product gas then flows upwardly in a zig zag fashion past the baffles 29 and is cooled by heat exchange with the feed gas flowing through the cooling tubes 28. The product gas then flows into an upper chamber of the reactor through at least one opening 31 near the upper end of the heat exchanger 4 in the outer shell 5 thereof. The thus-cooled product gas in the upper chamber flows downwardly through the holes 39 in the annular flange 14, through the cylindrical gas passage 13 along the inner surface of the outer pressure vessel 1 and finally is discharged through the gas outlet 34 at the bottom of the reactor vessel 1.

In the foregoing embodiment the reaction heat generated by the progress of the reaction during the passage of the gas through each catalyst bed is absorbed by the coolant in the same manner as in the embodiment of FIG. 1. The linear gas velocity in each catalyst bed is increased by dividing a single cylindrical catalyst bed, as in FIG. 1, into at least two horizontally sectorial catalyst beds through which the reactant gas flows radially in series. In this case, the same amount of gas is brought into contact with the same amount of catalyst to cause the reaction, as in the case of a single cylindrical catalyst bed. The heat transfer resistance from the reactant gas to the cooling tubes 15 in each catalyst bed is decreased, and the overall heat transfer coefficient in the absorption of the reaction heat by the cooling tubes is increased, so that the number of cooling tubes as well as the ratio of the volume occupied by cooling tubes to the total catalyst bed volume can be decreased on the whole as compared to the reactor shown in FIG. 1.

Figure 4:
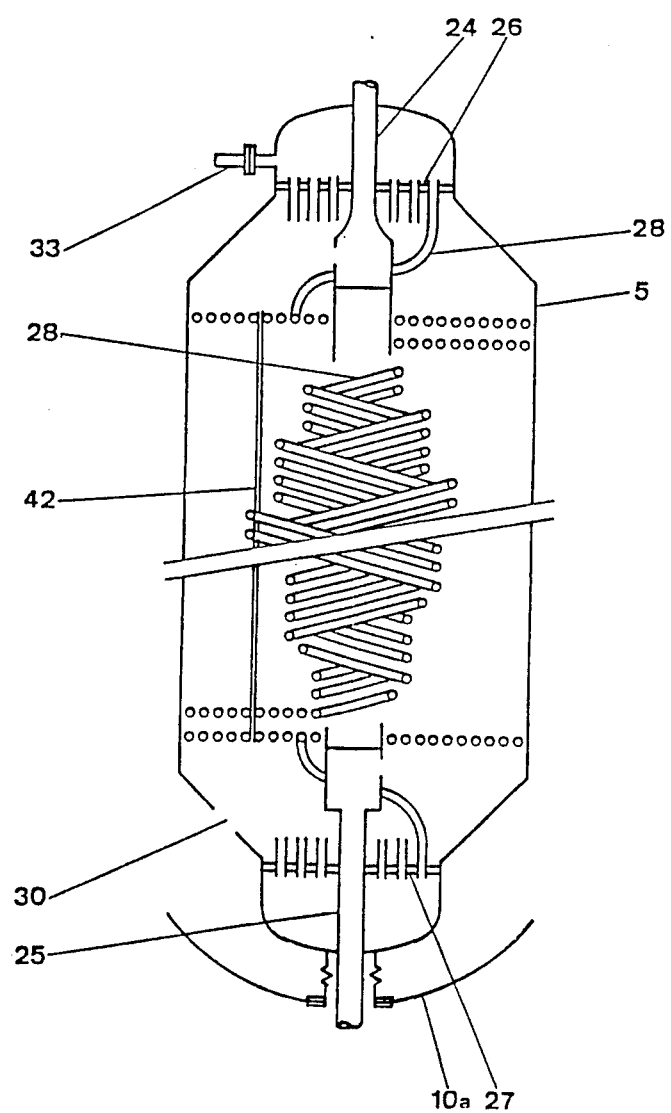
FIG. 4 is a vertical sectional view of an exemplary heat exchanger used in the reactor of the invention.

FIG. 4 illustrates an alternative embodiment of a heat exchanger 4 which may be used in the present invention as described in FIGS. 1-3. The heat exchanger 4 of FIG. 4 is a shell and tube type heat exchanger, but differs from the one shown in FIGS. 1 and 2 in that each tube 28 is of helical shape. The helical tubes 28 are arranged on a multiplicity of concentric circles of different diameters. Small diameter spacer rods 42 are set at desired intervals in the circumferential direction between radially adjacent spiral tubes, thereby maintaining radially adjacent spiral tubes at predetermined distances from each other and securing a gas flow space for the reactant gas flowing on the shell side. The shell and tube heat exchanger having such spiral tubes has a large heat transfer area in a relatively small shell space, and is thus preferred for use as a heat exchanger in the present invention.

A first advantage of the present invention is that, in a reactor which contains a gas containing a large amount of hydrogen at relatively high temperatures and pressures, carbon steel can be used as the material for fabricating the outer pressure vessel 1 because the outer pressure vessel 1 is maintained at a relatively low temperature. Moreover, cylindrical and radial partition walls made of relatively thin material can be used in the reactor according to the invention. Since the partition walls used inside the outer pressure vessel unavoidably come into contact with gas containing a large volume of hydrogen at high temperatures and pressures, it is necessary to use stainless steel in fabricating the partition walls in order to prevent hydrogen embrittlement. However, the reactor of the present invention can be constructed at less cost than conventional reactors because less stainless steel is needed. This advantage is especially great when a very large reactor must be constructed. A specific exemplary design will be described below in view of this advantage.

A second advantage of the present invention is that the maintenance and inspection of the reactor is reduced in complexity because both the coolant feed pipe and the coolant vapor discharge pipe pass through the top cover of the reactor, thereby enabling the coolant passage structure to be removed upwardly. This allows maintenance, inspection and repair of the reactor to be remarkably facilitated.

A third advantage of the present invention is that carbon steel can frequently be used to fabricate the coolant passage structure in spite of the hydrogen embrittlement problem with such steels. More specifically, boiling coolant passes through the coolant passage structure under pressure, but the coolant temperature is far lower than that of the gas flowing through the catalyst bed. Moreover, the heat transfer resistance between the metal which constitutes the cooling passage structure and the coolant is far less than the heat transfer resistance between the metal and the gas flowing through the catalyst bed, so that the surface temperature of the cooling tubes is slightly higher than the coolant temperature but far lower than the gas temperature. As a result, the coolant passage structure may frequently be made from carbon steel, even when stainless steel is required for the partition walls and the like as described above.

When carbon steel is used in the coolant passage structure, it is important to keep the surface of the coolant passage structure at a temperature of 350° C. or lower, preferably 330° C. or lower. The lower limit of the coolant passage structure surface temperature is about 100° C., if the coolant vapor generated is to be effectively used. At a surface temperature of 350° C. or lower, the formation of iron nitride on the surface of the coolant passage structure made from carbon steel, and the resulting embrittlement, can be avoided. Thus, the reactor can be safely operated even when ammonia is produced using the reactor according to the present invention from a gaseous mixture consisting of hydrogen and nitrogen as gaseous starting materials.

A number of embodiments other than the ones illustrated in FIGS. 1-4 are as follows. In FIGS. 2 and 3, the catalyst bed is divided into four equal catalyst beds by four radially extending vertical partition walls. However, there are many ways to divide a cylindrical catalyst bed. For example, such a catalyst bed can be divided into two or three beds instead of four beds, or can be divided into beds which are different in size from each other. The optimum catalyst bed arrangement varies with the type of reaction, performance of the catalyst, size of the reactor and similar factors, and must be determined in accordance with these factors. Generally, however, the reactor is preferably divided into from two to four catalyst beds. If the number of catalyst beds is excessively large, the structure of the reactor becomes corresponding excessively complex. It is also preferable to flow the reactant gas in series through at least two divided catalyst beds, because the aforementioned advantages of serial flow through divided catalyst beds are not achieved by flowing it through two such catalyst beds in parallel. It is occasionally preferable to flow the gas in parallel through some of the divided catalyst beds, and then flow the gas in series through the remainder of the catalyst beds.

It is sometimes desirable to not install a coolant passage structure in the catalyst bed through which the reactant gas flows first, when multiple catalyst beds are being employed. More particularly, if the reaction has an optimum temperature substantially equal to the heat generated by the reaction in the adiabatic catalyst bed, then the gas temperature can be increased to the desired temperature by omitting cooling tubes from the catalyst bed or using a smaller number of cooling tubes in the first catalyst bed. This arrangement can reduce or eliminate the need to preheat the gaseous raw materials.

In the examples described above, the product gas cooled by undergoing heat exchange with the gaseous raw materials flows downwardly along the inner surface of the outer pressure vessel of the reactor. However, it is possible to flow the product gas upwardly along the inner surface of the outer pressure vessel by changing the arrangement of the partition walls in the reactor. Such a modification can be readily carried out by those skilled in the art.

In the distributing manifolds for the liquid coolant, a structure utilizing an annular plate as used in the heat exchanger 4 can be used to split the coolant into each of the cooling tubes, and may further be used in the collecting manifold for collecting the coolant vapor vaporized by absorption of reaction heat and feeding it to the coolant vapor discharge pipe. However, when an annular plate structure is used in both liquid coolant manifolds, it is necessary to use an annular plate having a through hole for passage of the granular catalyst when the catalyst is charged into or discharged from the reactor as described in U.S. patent application Ser. No. 530,298, hereinabove incorporated by reference. Moreover, there is frequently a large difference between the pressure of the reactant gas and the pressure of the coolant, so that it is necessary to use a thick plate to fabricate the annular plate in the coolant structure. Accordingly, it is generally preferred to design the manifolds utilizing tubular members as illustrated in FIGS. 1-3. The above mentioned annular plate may be called also as a tube sheet.

It is further possible to discharge only coolant vapor that does not contain coolant liquid through the discharge pipe 23. It is advantageous to use an ordinary shell-and-tube type heat exchanger having a tube-plate structure as the heat exchanger for exchanging heat between the product gas and the fresh feed gas, in view of the relatively small pressure difference between the shell side and the tube side. Among such shell and tube heat exchangers, those in which the tubes are arranged spirally within the shell, as described above, are preferred since these heat exchangers have a large heat transfer area and a comparatively small shell volume.

The coolant used in the present invention should have a high thermal decomposition temperature, should be resistant to oxidation, and should be liquid at room temperature. Liquids such as water, a mixture of diphenyl and diphenyl oxide, alkylbenzene, alkylnaphthalene and the like are preferred. In using these materials as the coolant, the cooling system is maintained at a selected pressure so that the coolant will boil at the desired temperature. Changing the boiling pressure of the coolant in each of the coolant passage structures changes the temperature in the catalyst bed in which the coolant passage structure is installed. Moreover, in the reactor according to the present invention, the optimum temperature distribution for effecting the desired reaction can be established in the direction of flow of the reactant gas through each catalyst bed by arranging the cooling tubes in a particular formation in each catalyst bed. As a result, when the specific reaction, composition of the feed gas, reaction pressure and similar factors have been determined, a minimum size reactor can be designed according to the invention to produce the product. The reactor of the present invention can be made smaller than prior art reactors, yet can produce the same amount of gaseous product per unit time as larger prior art reactors.

In the catalyst beds of the reactor of this invention, it is preferred to pack a noncatalytic granular packing material having a slightly smaller particle size than the catalyst, such as alumina granules, below the upper face of the secondary distributing manifold 16 and above the lower face of the primary collecting manifold 19 in order to conserve the catalyst. Further, a heat insulating material is effectively attached on the outer surface of the partition walls nearest the outer pressure vessel in order to lower the temperature of the outer pressure vessel. However, if a noncatalytic granular packing material is packed in the lower and upper sections of each catalyst bed as described above, the use of a heat insulating layer on the outer surface of the bottom and uppermost parts of the partition wall nearest the outer pressure vessel can be omitted, as shown in FIG. 2.

The reactor of this invention is excellent for effecting reactions wherein a feed gas containing a large amount of hydrogen is contacted with a solid catalyst under relatively high gas pressures, such as the preparation of ammonia from a gaseous mixture of hydrogen and nitrogen, the production of lower and middle aliphatic monohydric alcohols such as methanol, ethanol, propanol, butanol and the like and mixtures thereof from a gaseous mixture of hydrogen and carbon monoxide and/or carbon dioxide, or the production of aliphatic saturated hydrocarbons containing 1 to 10 carbon atoms from the same gaseous mixture as used to prepare the foregoing alcohols, and the production of aliphatic saturated hydrocarbons by the hydrogenation of lower and medium olefins containing 1 to 10 carbon atoms.

EXAMPLE

Figure 5:
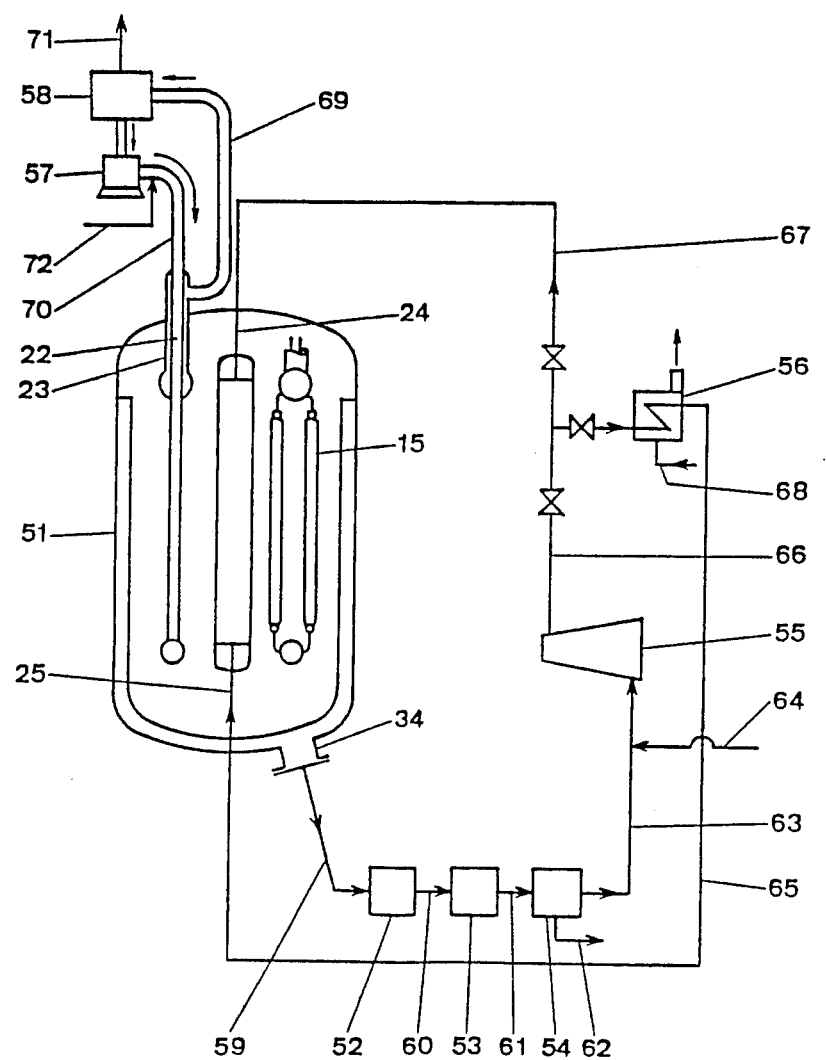
FIG. 5 is a schematic diagram of a process for the production of ammonia utilizing the reactor of the present invention.

A reactor according to the invention was used to conduct a reaction wherein a gaseous mixture containing 75 mol % hydrogen and 25 mol % nitrogen was contacted with a solid catalyst at a pressure of 150 kg/cm$^2$G to produce ammonia. FIG. 5 illustrates a process flow chart for this synthetic process.

In FIG. 5, a reactor 51 is the same reactor as described in FIG. 1 above, except that the reactor 51 is equipped with a heat exchanger as illustrated in FIG. 4. A feed gas is fed through a pipe 67 into the main feed gas inlet 24 of the reactor 51. Product gas containing gaseous ammonia resulting from the catalytic reaction occurring in the reactor, as described above, is discharged through the gas outlet 34 and passes through a pipe 59 to a water cooler 52 wherein part of the produced ammonia is condensed and liquefied. The remaining gas is then fed through a pipe 60 into a low temperature heat exchanger 53 to be cooled by heat exchange with liquid ammonia therein. The gas further cooled by the low temperature heat exchanger 53 condenses and liquefies most of the remaining ammonia, and the gas-liquid mixture is then fed through a pipe 61 to a separator 54 wherein the condensed liquid ammonia is separated and discharged through a pipe 62 as a product. The uncondensed, unreacted gas is fed through a pipe 63 to a compressor 55 wherein it is pressurized together with fresh feed gas supplied through a pipe 64, and the resulting mixture is recycled to the reactor 51 through the pipes 66, 67.

During start-up of the reactor, the greater part of the gas from the circulating compressor 55 passing out of the pipe 66 is introduced into a heater 56 wherein it is heated to a predetermined temperature by combustion of a fuel supplied to a pipe 68. Thereafter, the thus-preheated gas is fed through a pipe 65 into the reactor at the secondary inlet 25 thereof, and passes out of the outlet 34 to create a gas circulation through the pipes 59–63 as described above.

After the catalyst bed has reached a predetermined temperature, the flow of feed gas is rechanneled from the secondary inlet 25 to the main inlet 24 and the reactor is brought to its normal state of operation.

Water is used as the coolant in this example. Pressurized water is boiled when it absorbs reaction heat in the cooling tubes 15 and passes out of the reactor as a vapor-liquid mixture through the pipe 23 and is fed through a pipe 69 to a separator 58 wherein steam and liquid water are separated. The steam is discharged through a pipe 71 to be conducted elsewhere for a desired purpose. The unvaporized water separated in the separator 58 is recirculated to the coolant feed pipe 22 through a pipe 70 by means of a pump 57. Circulation of the unvaporized water can also be carried out by gravity feed without use of the pump 57. Fresh boiler feed water in an amount equivalent to the steam discharged through the pipe 71 is supplied through a pipe 72 and combined with the unvaporized water from the separator 58.

Both the outer pressure vessel and the coolant passage structure of the reactor in this example are made of carbon steel. The partition walls and other parts of the reactor are made of stainless steel. Requirements such as gas volume and dimensions such as the size of the reactor according to this example are as follows:

| | |
|---|---|
| Inner diameter of the cylindrical central portion of the outer pressure vessel | 3,650 mm |
| Length of the cylindrical central portion of the outer pressure vessel | 17,400 mm |
| Inner diameter of inner catalyst retainer | 1,730 mm |
| Outer diameter of outer catalyst retainer | 3,350 mm |
| Packing height of catalyst | 15,000 mm |
| Outer diameter of each cooling tube | 38 mm |
| Total number of cooling tubes | 500 |
| Number of cooling zones | 6 |
| Heat transfer area of gas heat exchanger | 4,000 m$^2$ |
| Feed gas volume at the inlet of heat exchanger | 500,000 Nm$^3$/hr |
| Feed gas temperature at the inlet of the heat exchanger | 50° C. |
| Feed gas temperature at the inlet of the catalyst bed | 400° C. |
| Product gas temperature at the outlet of the catalyst bed | 500° C. |
| Product gas temperature at the outlet of the heat exchanger | 70° C. |
| Pressure of cooling water in cooling tubes | 120 kg/cm$^2$G |
| Amount of liquid ammonia produced | 41,600 kg/hr |
| Pressure of steam generated | 120 kg/cm$^2$G |
| Amount of steam generated | 80,000 kg/hr |

According to another design, the partition walls in the reactor were arranged so that cool feed gas entering the reactor is flowed along the inner surface of the outer pressure vessel and then into the heat exchanger to be preheated by the effluent gas from the catalyst bed. In this case, the partition walls, catalyst retainers and other parts made of stainless steel were about 40 metric tons larger in total weight than the corresponding parts in the reactor of this example of the invention. All of the partition walls, catalyst retainers and other parts are made of stainless steel in this comparative reactor so that the cost required to fabricate the reactor is considerably greater than the cost of the reactor according to the present invention.

The embodiments of the invention in which an exclusive property or privilege is claimed are defined as follows:

1. In a reactor including an outer pressure vessel having an inlet passage for feeding gaseous feed materials into said pressure vessel and an outlet passage for discharging a product gas therefrom, a bed of a granular catalyst and means for flowing a reactant gas comprising the gaseous feed materials through said granular catalyst so that it reacts to form a product gas, means for cooling the product gas and preheating the gaseous feed materials, and means for cooling the reactant gas as the reactant gas passes through said catalyst bed, the improvement which comprises:

said outer pressure vessel is upright and cylindrical, and comprises a bottom cover and a removable top cover;

said cooling and preheating means comprises a heat exchanger centrally mounted within said outer pressure vessel coaxially therewith, said heat exchanger comprising a substantially cylindrical outer shell, upper and lower partition plates subdividing the interior of said shell in the lengthwise direction thereof, a plurality of heat exchanger tubes extending from said upper partition plate to said lower partition plate, said heat exchanger tubes opening above said upper partition plate and opening below said lower partition plate, said partition plates being positioned so as to define a shell-side heat exchange compartment therebetween, an upper chamber above said upper partition plate and a lower chamber below said lower partition plate, said shell of said heat exchanger having openings at opposite end portions thereof so that a gas can enter said compartment near one end of said compartment and be discharged from the opening at the other end of said compartment, said inlet passage for the gaseous feed materials being in communication with said shell-side heat exchange compartment of said heat exchanger so that the gaseous feed materials undergo heat exchange and are thereby preheated before being fed to said catalyst bed;

said catalyst bed comprises spaced-apart inner and outer cylindrical gas-permeable catalyst retainers being positioned and arranged so as to define an intercylinder space therebetween coaxial with said outer pressure vessel and said heat exchanger, said inner catalyst retainer being of smaller diameter than said outer catalyst retainer, and a bottom wall extending beneath said catalyst retainers and fixedly connecting said catalyst retainers to each other, said catalyst retainers and said bottom wall being spaced apart from the inner periphery of said outer pressure vessel, said granular catalyst being packed in the intercylinder space between said inner and outer catalyst retainers above said bottom wall;

said cooling means comprises a cooling structure having a coolant inlet passage and a coolant outlet passage which both extend through said top cover of said outer pressure vessel, and a multiplicity of vertical cooling tubes which extend through said catalyst bed, said granular catalyst being packed around said cooling tubes, each of said cooling tubes being in communication with said coolant inlet passage and said coolant outlet passage so that a liquid coolant may be circulated through said cooling structure to absorb reaction heat generated in said catalyst bed;

a cylindrical, gas-impermeable, outer, partition wall coaxial with said outer pressure vessel and located between said outer pressure vessel and said outer gas-permeable catalyst retainer and spaced therefrom and positioned so as to define a first outer gas flow passageway between said outer pressure vessel and said cylindrical outer partition wall and a second inner gas flow passageway between said cylindrical outer partition wall and said outer catalyst retainer, whereby the product gas from said catalyst bed is discharged through said outer catalyst retainer into said second inner gas flow passageway, flows through said second inner flow passageway and thence into the tubes of said heat exchanger, undergoes heat exchange with the gaseous feed materials, in said heat exchanger, thereby cooling the product gas, and then is fed through said first outer gas flow passageway to said product gas outlet formed on said outer pressure vessel.

2. A reactor for effecting a catalytic reaction wherein pressurized gaseous feed materials containing hydrogen contact a granular catalyst at an elevated temperature to form a high temperature reaction product gas, said reactor comprising:

a cylindrical, vertical, outer, pressure vessel having a top cover, a bottom cover, an inlet for the gaseous feed materials and an outlet for the reaction product gas;

a shell-and-tube heat exchanger centrally mounted within said outer pressure vessel and coaxial therewith, said heat exchager comprising a vertically mounted cylindrical outer shell, upper and lower partition plates inside said shell defining the upper and lower ends of a shell-side heat exchange compartment therein and also defining upper and lower chambers within said shell which upper and lower chambers do not communicate with said compartment and a plurality of heat exchange tubes which penetrate said partition plates and extend into and through said compartment but do not communicate therewith, said heat exchanger having a heat transfer area sufficient to preheat low temperature gaseous feed materials and to cool the high temperature reaction product gas to a temperature below 300° C., by flowing the gaseous feed materials and the reaction product gas in indirect heat exchanging relationship in said heat exchanger;

inner and outer, coaxial, cylindrical, gas-permeable, catalyst retainers, said catalyst retainers being mounted within said pressure vessel coaxially therewith and located between said shell of said heat exchanger and said pressure vessel, said inner and outer catalyst retainers positioned so as to define an annular intercylinder space;

a bottom wall extending beneath said catalyst retainers and fixedly connecting said catalyst retainers to each other;

granular catalyst bed means packed in said intercylinder space between said catalyst retainers above said bottom wall;

first feed gas passage means for conducting the gaseous feed materials to said shell-side heat exchange compartment, and second feed gas passage means for introducing preheated gasous feed materials discharged from said shell-side heat exchange compartment of said heat exchanger into said catalyst bed means and flowing the preheated gaseous feed materials radially through said catalyst bed means;

first reaction product gas passage means for conducting the high temperature reaction product gas discharged from said catalyst bed means to said heat exchange tubes of said heat exchanger for indirect heat exchange interaction with the gaseous feed materials whereby to cool the reaction product gas and to heat the gaseous feed materials;

second reaction product gas passage means for receiving the cooled reaction product gas discharged from said heat exchange tubes of said heat exchanger;

a cooling passage structure for indirectly cooling the contents of said catalyst bed means by passing a liquid coolant therethrough, the liquid coolant having a boiling point temperature which permits the liquid coolant to boil when subjected to an elevated temperature and pressure, said coolant passage structure comprising coolant inlet passage means and coolant outlet passage means both extending through said top cover of said outer pressure vessel, at least one coolant distributing header for receiving coolant from said coolant inlet passage means and at least one coolant collecting header for supplying coolant to said coolant outlet passage means and a multiplicity of vertical cooling tubes which extend vertically within said catalyst bed means, said cooling tubes being arranged in at least one arcuate formation concentric with the vertical axis of said outer pressure vessel, the lower end of each of said cooling tubes being connected with said coolant inlet passage means by said at least one coolant distributing header and the upper end of each of said cooling tubes being connected with said coolant outlet passage means by said at least one coolant collecting header, so that the coolant may be circulated through said cooling passage structure, said coolant inlet passage means supplying the liquid coolant to the lower ends of said cooling tubes by said at least one distributing header and said coolant outlet passage means discharging vapor of the coolant or a liquid-vapor mixture of the coolant collected by said at least one collecting header from the upper ends of said cooling tubes; and a cylindrical, gas-impermeable, outer, partition wall having a heat insulating layer thereon, said gas-impermeable outer partition wall being mounted coaxially within said pressure vessel and being located between and spaced from said pressure vessel and said outer, gas-permeable, catalyst retainer, said cylindrical outer partition wall being positioned and arranged so as to define a first elongated passageway between said pressure vessel and said cylindrical outer partition wall and defining a second elongated passageway between said cylindrical outer partition wall and said outer catalyst retainer, which first and second passageways are not in direct communication with each other, one end of said first passageway being in direct communication with said outlet for the product gas, the other end of said first passageway being connected to said second reaction product gas passage means so that the cooled reaction product gas discharged from said heat exchanger flows into and through said first passageway, said second passageway being connected with said first reaction product gas passage means for directing the high temperature reaction product gas discharged from said catalyst bed means into said heat exchange tubes of said heat exchanger.

3. A reactor as claimed in claim 2, wherein said first feed gas passage means for the gaseous feed materials comprises an inlet pipe which successively penetrates said top cover of said outer pressure vessel, said shell of said heat exchanger, and said top partition plate of said heat exchanger, said inlet pipe opening into said shell-side heat exchange compartment of said heat exchanger so that the gaseous feed materials flow downwardly therein, said shell having lateral openings at a lower and portion thereof so that the gaseous feed materials flow radially outwardly out of said compartment through said openings, then pass through said second feed gas passage means between said outer shell of said heat exchanger and said inner catalyst retainer, then flow radially outwardly through said inner catalyst retainer into said catalyst bed, then flow out of said catalyst bed through said outer catalyst retainer into said second passageway and thence into said first reaction product gas passage means, and the thus-formed product gas then is fed to said lower chamber within said heat exchanger, then passes upwardly through said heat exchanger tubes, then passes into said upper chamber of said heat exchanger, then passes radially outwardly into said second reaction product gas passage means and thence into said first passageway, the reaction product gas then flows to said product gas outlet and is discharged therethrough.

4. A reactor for effecting a catalytic reaction wherein pressurized gaseous feed materials containing hydrogen contact a granular catalyst at an elevated temperature to form a high temperature reaction product gas, said reactor comprising:

a cylindrical, vertical, outer, pressure vessel having a top cover, a bottom cover, an inlet for the gaseous feed materials and an outlet for the reaction product gas;

a shell-and-tube heat exchanger centrally mounted within said outer pressure vessel and coaxial therewith, said heat exchanger comprising a vertically mounted cylindrical outer shell, upper and lower partition plates inside said shell defining the upper and lower ends of a shell-side heat exchange compartment therein and also defining upper and lower chambers within said heat exchanger which upper and lower chambers do not communicate with said compartment and a plurality of heat exchange tubes which penetrate said partition plates and extend into and through said compartment but do not communicate therewith, said heat exchanger having a heat transfer area sufficient to preheat low temperature gaseous feed materials and to cool the high temperature reaction product gas to a temperature below 300° C., by flowing the gaseous feed materials and the reaction product gas in indirect heat exchanging relationship in said heat exchanger;

inner and outer, coaxial, cylindrical, gas-permeable, catalyst retainers, said catalyst retainers being mounted within said pressure vessel coaxially therewith and located between said shell of said heat exchanger and said pressure vessel, said inner and outer catalyst retainers positioned so as to define an annular intercylinder space;

a bottom wall extending beneath said catalyst retainers and fixedly connecting said catalyst retainers to each other;

granular catalyst bed means packed in the intercylinder space between said catalyst retainers above said bottom wall;

first feed gas passage means for conducting the gaseous feed materials to said heat exchange tubes of said heat exchanger, and second feed gas passage means for introducing preheated gaseous feed materials discharged from said heat exchange tubes of said heat exchanger into said catalyst bed means and flowing the preheated gaseous feed materials radially through said catalyst bed means;

first reaction product gas passage means for conducting the high temperature reaction product gas discharged from said catalyst bed means to said shell-side heat exchange compartment for indirect heat exchange interaction with the gaseous feed materials whereby to cool the reaction product gas and to heat the gaseous feed materials;

second reaction product gas passage means for receiving the cooled reaction product gas discharged from said shell-side heat exchange compartment of said heat exchanger;

a cooling passage structure for indirectly cooling the contents of said catalyst bed means by passing a liquid coolant therethrough, the liquid coolant having a boiling point temperature which permits the liquid coolant to boil when subjected to an elevated temperature and pressure, said coolant passage structure comprising coolant inlet passage means and coolant outlet passage means both extending through said top cover of said outer pressure vessel, at least one coolant distributing header for receiving coolant from said coolant inlet passage means and at least one coolant collecting header for supplying coolant to said coolant outlet passage means and a multiplicity of vertical cooling tubes which extend vertically within said catalyst bed means, said cooling tubes being arranged in at least one arcuate formation concentric with the vertical axis of said outer pressure vessel, the lower end of each of said cooling tubes being connected with said coolant inlet passage means by said at least one coolant distributing header and the upper end of each of said cooling tubes being connected with said coolant outlet passage means by said at least one coolant collecting header so that the coolant may be circulated through said cooling passage structure, said coolant inlet passage means supplying the liquid coolant to the lower ends of said cooling tubes by said at least one distributing header and said coolant outlet passage means discharging vapor of the coolant or a liquid-vapor mixture of the coolant collected by said at least one collecting header from the upper ends of said cooling tubes; and a cylindrical, gas-impermeable, outer, partition wall having a heat insulating layer thereon, said gas-impermeable outer partition wall being mounted coaxially within said pressure vessel and being located between and spaced from said pressure vessel and said outer, gas-permeable, catalyst retainer, said cylindrical outer partition wall being positioned and arranged so as to define a first elongated passageway between said pressure vessel and said cylindrical outer partition wall and defining a second elongated passageway between said cylindrical outer partition wall and said outer catalyst retainer, which first and second passageways are not in direct communication with each other, one end of said first passageway being in direct communication with said outlet for the product gas, the other end of said first passageway being connected to said second reaction product gas passage means so that the cooled reaction product gas discharged from said heat exchanger flows into and through said first passageway, said second passageway being connected with said first reaction product gas passage means for directing the high temperature reaction product gas discharged from said catalyst bed means into said shell-side heat exchange compartment of said heat exchanger.

5. A reactor as claimed in claim 2 or claim 4, wherein the intercylinder space between said catalyst retainers is divided so as to divide said catalyst bed means into at least two catalyst beds which are not in direct communication with each other and have substantially sectorial horizontal cross sections, said at least two catalyst beds being defined by a plurality of radially extending vertical partition walls which extend in different radial directions in said intercylinder space, and wall means for directing the gaseous feed materials to flow in series through said at least two catalyst beds and to flow in a radial direction through each of said at least two catalyst beds.

6. A reactor as claimed in claim 5, further comprising means for allowing communication between said cooling tubes installed in the same one of each of said at least two catalyst beds to form a single cooling zone in each of said at least two catalyst beds, each of said cooling zones having separate coolant inlet and coolant outlet passages associated therewith.

7. A reactor as claimed in claim 5 wherein said cooling passage structure does not extend through one of said at least two catalyst beds.

8. A reactor as claimed in claim 4, wherein said coolant inlet and coolant outlet passages means comprises a duplex pipe which extends into said reactor through the top cover of said outer pressure vessel, said duplex pipe including an inner pipe and an outer pipe coaxially positioned and arranged to define an annular space, said coolant inlet, passage means comprising the interior of said inner pipe, and said coolant outlet passage means is defined by said annular space between said inner and outer pipes.

9. A reactor as claimed in claim 2 or claim 4 wherein said at least one coolant distributing header and said at least one coolant collecting header are substantially tubular members.

10. A reactor as claimed in claim 4, wherein each of said heat exchanger tubes is of spirally curved shape within said compartment of said heat exchanger.

11. A reactor as claimed in claim 2 or claim 4, wherein said cooling passage structure comprises a duplex pipe which extends through said top cover of said outer pressure vessel, said duplex pipe comprising an inner pipe and an outer pipe positioned and arranged to define an annular space therebetween, the interior of said inner pipe comprising said coolant inlet passage means and the annular space between said inner and outer pipes defining said coolant outlet passage means, said inner pipe penetrating to a location near said bottom wall beneath said catalyst bed means at which location said inner pipe communicates with said at least one distributing header which distributes the coolant to the bottom ends of said tubes, under pressure, and after the coolant passes upwardly through said tubes and is heated by heat exchange with said catalyst bed means to form coolant vapor, the coolant vapor is collected in said at least one collecting header which communicates directly with said coolant outlet passage.

12. A reactor as claimed in claim 2 or claim 4 wherein said grannular catalyst bed means is a single annular catalyst bed.

13. A reactor as claimed in claim 12, in which said at least one coolant distributing header is a single distributing header and said at least one coolant collecting header is a single collecting header, the upper ends of all of said cooling tubes are connected to said signle collecting header and the lower ends of all of said cooling tubes are connected to said single distributing header so that said cooling tubes form a single cooling zone in said annular catalyst bed.

14. A reactor as claimed in claim 12, in which said at least one coolant distributing header comprises at least two distributing headers and said at least one coolant collecting header comprises at least two collecting headers, said cooling tubes are separated into at least two separate groups which are not in communication with each other, the lower ends of said cooling tubes of each group being connected to a single one of said at least two distributing headers and the upper ends of said cooling tubes of each group being connected to a single one of said at least two collecting headers, whereby said groups form at least two cooling zones that occupy different radial portions of said annular catalyst bed, each of said groups of cooling tubes having separate coolant outlet and coolant inlet passages connected thereto.

15. In a reactor including an outer pressure vessel having an inlet passage for feeding gaseous feed materials into said pressure vessel and an outlet passage for discharging a product gas therefrom, a bed of a granular catalyst and means for flowing a reactant gas comprising the gaseous feed materials through said granular catalyst so that it reacts to form a product gas, means for cooling the product gas and preheating the gaseous feed materials, and means for cooling the reactant gas as the reactant gas passes through said catalyst bed, the improvement which comprises:

said outer pressure vessel is upright and cylindrical, and comprises a bottom cover and a removable top cover;

said cooling and preheating means comprises a heat exchanger centrally mounted within said outer pressure vessel coaxially therewith, said heat exchanger comprising a substantially cylindrical outer shell, upper and lower partition plates subdividing the interior of said shell in the lengthwise direction thereof, a plurality of heat exchanger tubes extending from said upper partition plate to said lower partition plate, said heat exchanger tubes opening above said upper partition plate and opening below said lower partition plate, said partition plates being positioned so as to define a shell-side heat exchange compartment therebetween, an upper chamber above said upper partition plate and a lower chamber below said lower partition plate, said shell of said heat exchanger having openings at opposite end portions thereof so that a gas can enter said compartment near one end of said compartment and be discharged from the opening at the other end of said compartment, said inlet passage for the gaseous feed materials being in communication with said heat exchanger tubes of said heat exchanger so that the gaseous feed materials undergo heat exchange and are thereby preheated before being fed to said catalyst bed;

said catalyst bed comprises spaced-apart inner and outer cylinder gas-permeable catalyst retainers being positioned and arranged so as to define an intercylinder space therebetween coaxial with said outer pressure vessel and said heat exchanger, said inner catalyst retainer being of smaller diameter than said outer catalyst retainer, and a bottom wall extending beneath said catalyst retainers and fixedly connecting said catalyst retainers to each other, said catalyst retainers and said bottom wall being spaced apart from the inner periphery of said outer pressure vessel, said granular catalyst being packed in the intercylinder space between said inner and outer catalyst retainers above said bottom wall;

said cooling means comprising a cooling structure having a coolant inlet passage and a coolant outlet passage which both extend through said top cover of said outer pressure vessel, and a multiplicity of vertical cooling tubes which extend through said catalyst bed, said granular catalyst being packed around said cooling tubes, each of said cooling tubes being in communication with said coolant inlet passage and said coolant outlet passage so that a liquid coolant may be circulated through said cooling structure to absorb reaction heat generated in said catalyst bed;

a cylindrical, gas-impermeable, outer, partition wall coaxial with said outer pressure vessel and located between said outer pressure vessel and said outer gas-permeable catalyst retainer and spaced therefrom so as to be positioned to define a first outer gas flow passageway between said outer pressure vessel and said cylindrical outer partition wall and a second inner gas flow passageway between said cylindrical outer partition wall and said outer catalyst retainer, whereby the product gas from said catalyst bed is discharged through said outer catalyst retainer into said second inner gas flow passageway, flows through said second inner flow passageway and thence into said shell-side heat exchange compartment of said heat exchanger, undergoes heat exchange with the gaseous feed materials in said heat exchanger, thereby cooling the product gas, and then is fed through said first outer gas flow passageway to the product gas outlet formed on said outer pressure vessel.

16. A reactor as claimed in claim 1 or claim 15, further comprising a plurality of upright, radially extending partition walls which span said inner and outer catalyst retainers to thereby define a plurality of separate catalyst beds which are sectorial in horizontal cross section, a plurality of radially extending partition walls within said second inner gas flow passage which subdivide said second inner gas flow passage into a plurality of second inner gas flow passage sections, and a plurality of radially extending partition walls within an internal gas flow passage defined between said outer shell of said heat exchanger and said inner catalyst retainer which partition walls subdivide said internal gas flow passage into a plurality of internal gas flow passage sections, all of said partition walls being positioned so that the reactant gas is first fed through said heat exchanger and preheated therein, and then fed alternately radially inwardly and radially outwardly through said catalyst beds in series by said gas flow passage sections, the reactant gas passing alternately through one of said second inner gas flow passage sections, then radially through one of said catalyst beds, then through one of said internal gas flow passage sections to the next catalyst of said beds in series.

* * * * *

UNITED STATES PATENT AND TRADEMARK OFFICE
CERTIFICATE OF CORRECTION

PATENT NO. : 4,714,592

DATED : December 22, 1987

INVENTOR(S) : Jun ZANMA et al

It is certified that error appears in the above-identified patent and that said Letters Patent is hereby corrected as shown below:

Column 26, line 1; before "claim 4" insert ---claim 2 or---.
line 2; change "passages" to ---passage---.
line 15; before "claim 4" insert ---claim 2 or---.
Column 27, line 37; change "cylinder" to ---cylindrical---.
line 51; change "comprising" to ---comprises---.

Signed and Sealed this

Nineteenth Day of July, 1988

Attest:

DONALD J. QUIGG

Attesting Officer     Commissioner of Patents and Trademarks